United States Patent
Avery et al.

[11] Patent Number: 5,540,590
[45] Date of Patent: Jul. 30, 1996

[54] METHOD FOR PREDICTING HUMAN EVALUATION OF LATCHING AND UNLATCHING SOUNDS

[75] Inventors: Jerome Avery, Southfield; Scott Amman, Royal Oak; Stephen P. Jones, Birmingham, all of Mich.

[73] Assignee: Ford Motor Company, Dearborn, Mich.

[21] Appl. No.: 418,228

[22] Filed: Apr. 6, 1995

[51] Int. Cl.⁶ .................................................. G09B 7/04
[52] U.S. Cl. ............................ 434/236; 434/237; 73/571
[58] Field of Search .................................. 434/308, 319, 434/236–238; 73/585, 570, 571

[56] References Cited

U.S. PATENT DOCUMENTS

| | | | |
|---|---|---|---|
| 4,321,427 | 3/1982 | Singh | 73/585 |
| 5,303,327 | 4/1994 | Sturner et al. | 434/185 |

Primary Examiner—Richard J. Apley
Assistant Examiner—Glenn E. Richman
Attorney, Agent, or Firm—Daniel M. Stock; Roger L. May

[57] ABSTRACT

A analytical method is provided for predicting human evaluation response to the quality of sounds produced by the operation of the power door lock actuator assembly involving the computation of predicted sound preference from recorded data on certain sound parameters of a sample or samples of the power door lock actuator mechanism.

8 Claims, 3 Drawing Sheets

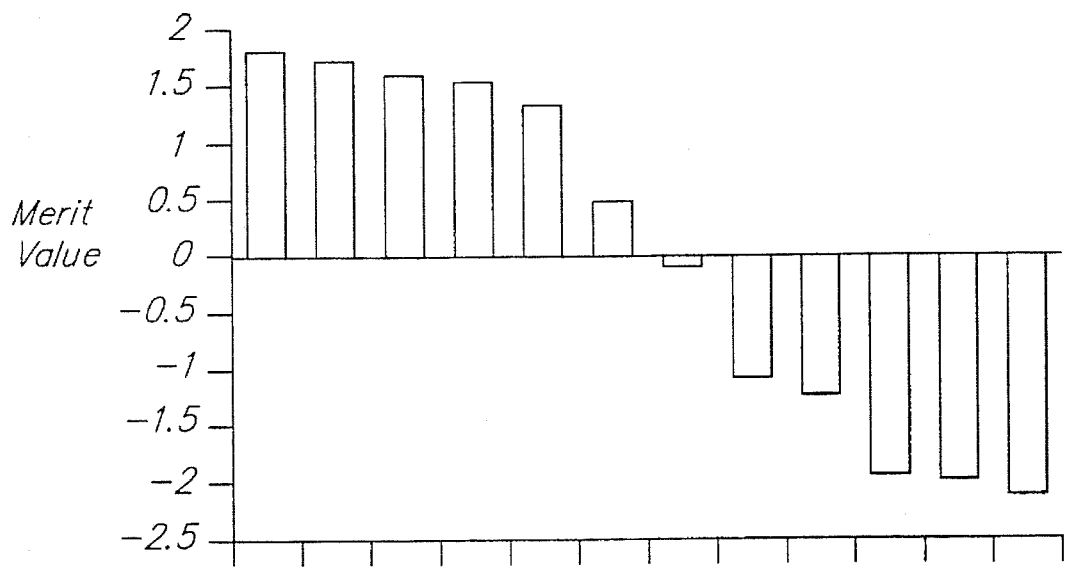
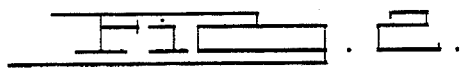
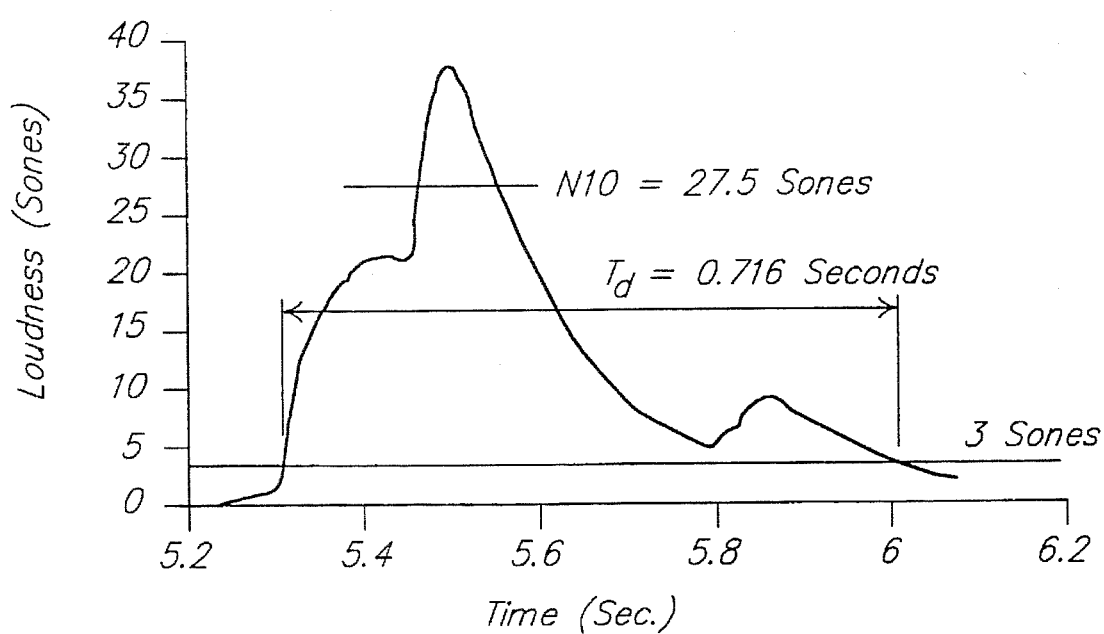
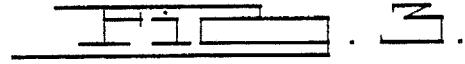

METHOD FOR PREDICTING HUMAN EVALUATION OF LATCHING AND UNLATCHING SOUNDS

BACKGROUND OF THE INVENTION

1. Field of the Invention

The present invention relates to methods for predicting human evaluation of the quality of sounds produced by operation of automotive components, and more specifically to the employment of such methods in the design of automotive power door lock mechanisms.

2. Prior Art

In the highly competitive automotive manufacturing industry, the perception of quality by customers is particularly important. Customer perception of quality of sound experienced during operation of certain vehicle components and systems is a major contributing factor to that perception of quality.

It is well known from consumer studies that the perceived noise during locking and unlocking of an automotive vehicle door through a power door lock actuator assembly produces widely varying perceptions of quality. The power door lock actuator assembly is a relatively complex assembly when viewed as a sound generator, owing in large part to the plurality of mechanical and electrical sounds generated. Prior art approaches to producing a pleasing quality-indicating sound for a potential customer have been more reactionary and developmental than analytical. There has been no design practice in the automotive industry which provides an analytical approach to designing power door lock actuator mechanisms which produce acceptable sound output to a user of the power door lock actuator mechanism.

SUMMARY OF THE INVENTION

It is an object of the present invention to provide an analytical method for predicting human evaluation of the latching and unlatching sounds of a power door lock actuator mechanism which includes collecting data on latching and unlatching sounds of a number sample mechanism, subjectively evaluating the human perception of the quality of the sounds, ranking mechanisms according to sound quality, correlating the data collected to define at least two sound parameters with direct causal relationship with the human rankings, and using that data to compute sound data to be generated by locking and unlocking of another sample of a power door lock actuator mechanism utilizing these two sound parameters.

BRIEF DESCRIPTION OF THE DRAWINGS

These and other objects of the present invention will become apparent upon reading the following description with reference to the accompanying drawing, in which:

FIG. 2 is a preference distribution chart displaying data derived from the practice of the method of the present invention;

FIG. 3 is a plot of sound versus time illustrating time degree parameters $t_d$ and $n_{10}$.

DESCRIPTION OF THE PREFERRED EMBODIMENT

Figure 1:
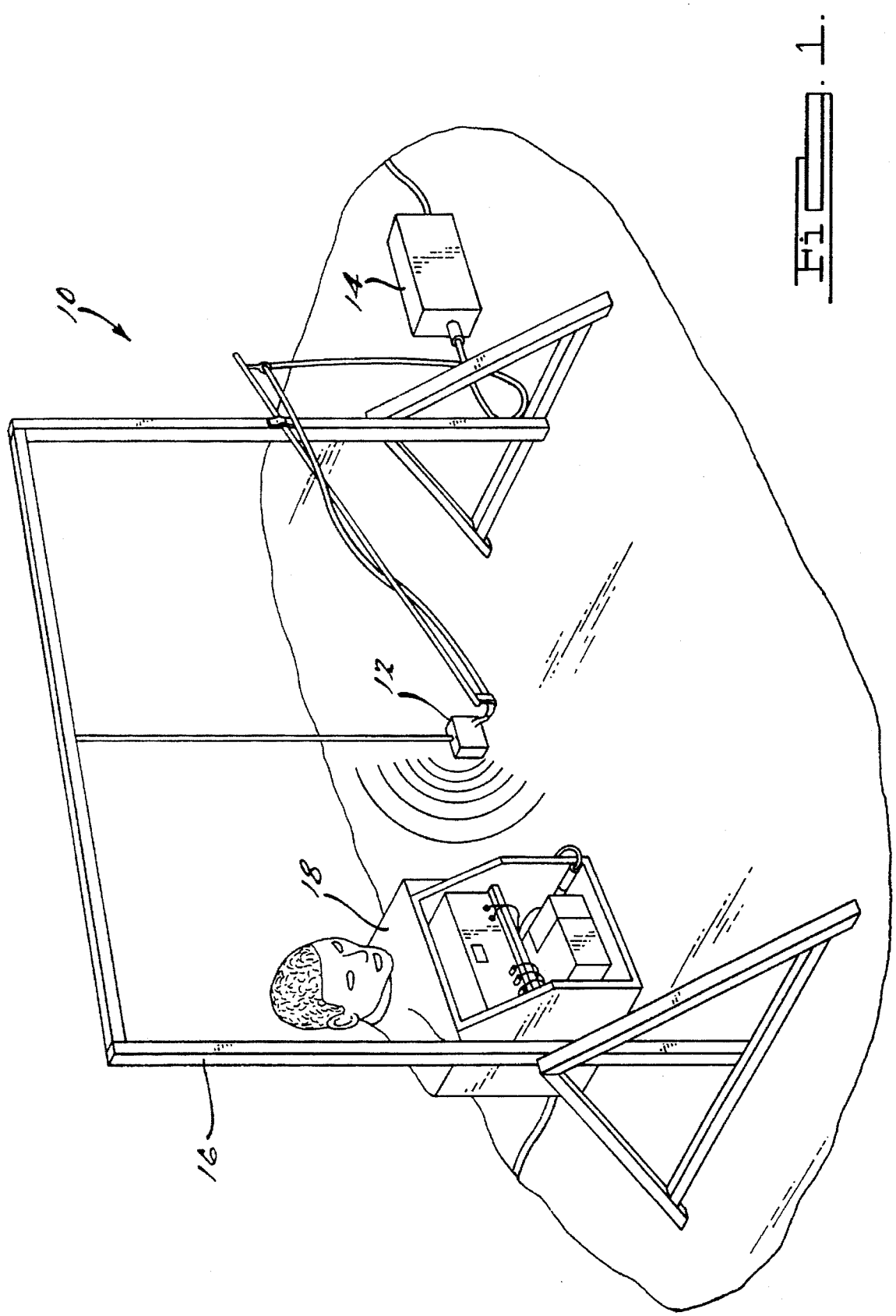
FIG. 1 is a perspective view of a test stand utilizing the method of the present invention.

In order to analyze the sound quality of power door lock mechanisms generally, a plurality of power door lock actuators are preferably operated in a controlled environmeant, such as the test stand 10, illustrated in FIG. 1. In that test, a power door lock actuator mechanism 12, connected to a power supply 14, is suspended from a frame 16 a fixed distance from a binaural acoustic head 18. The head 18, of known construction, is preferably used for all data recordings. The power door lock 12 is centered in front of the artificial head positioned 25½ inches in front of it and 6½ inches below the ears of the head. A voltage of 12.6 volts is preferably applied to the power door lock actuator 12 to activate it in either locked or unlocked position a number of times. The sounds received from actuating the power door lock actuator 12 are recorded from the binaural acoustic head 18 by means of digital audio tape in a known manner.

The recordings created are preferably used for a subjective evaluation of the sounds of the plurality of power door lock actuators. A preferred method for subjectively evaluating the actuators 12 involves use of paired comparisons of preference. In such a process, subjects are presented with pairs of sounds and asked to indicate which of two sounds they prefer. This process may be repeated for every possible pair in random order with all pairs duplicated and checked for repeatability of a human subject's perception. In one successful practice of this process, 24 subjects evaluated the locking and unlocking sound quality of 12 different samples of power door lock actuators.

Using the pair comparison methodology, the data collected from the subjective evaluation by human subjects of the quality of the sounds is preferably ranked according to sound quality. FIG. 2 shows a distribution chart for evaluation of 12 sample power lock mechanism with positive merit values (a well known term of the statistical art) indicating pleasing sounds and negative merit values indicating those sounds less preferred. It will be appreciated by those skilled in the statistical arts that other methodology for ranking human preference might also be used.

In general, it is known that for pulsive automotive component sounds, human evaluators favorably evaluate short-lived sounds without multiple impacts that can be perceived. Sounds that are perceived to have multiple impacts, such as metallic clicks or rattles, are generally judged by evaluators to come from poor quality components. One single impact is more desirable for the perception of solid and definite engagement of a component such as a power door lock actuator.

With this background, according to the preferred method, the results of the subjective evaluations are analyzed to determine what characteristics the sound of preferred systems have. It has been determined that for power door lock actuators, only certain parameters of the sound event provided strong correlation with human evaluator customer perception. One of these was found through measuring the time $t_d$ it takes for sound to reach three sones and to decay to three sones. FIG. 3 illustrates such a decay for one sample. It has also been determined that $n_{10}$, the sound level exceeded 10% of the time during a sound event, is also a good indicator of perception of sound quality by a human evaluator. Analyzing data for each sample tested has shown a good correlation between minimizing $t_d$ and $n_{10}$ for higher merit values, that is, good perceptions of sound quality.

It will be appreciated, of course, that in analyzing any set of data from a plurality of samples, certain objective characterization of data may be necessary to cast out samples that have different noise sound generators from the remaining samples.

Knowing that once there has been a correlation of subjective and objective results and upon identifying dominant characteristics in sound parameters, such as $t_d$ and $n_{10}$, computation to predict subjective response to objective data can be accomplished. A regression equation has been used successfully.

Figure 4:
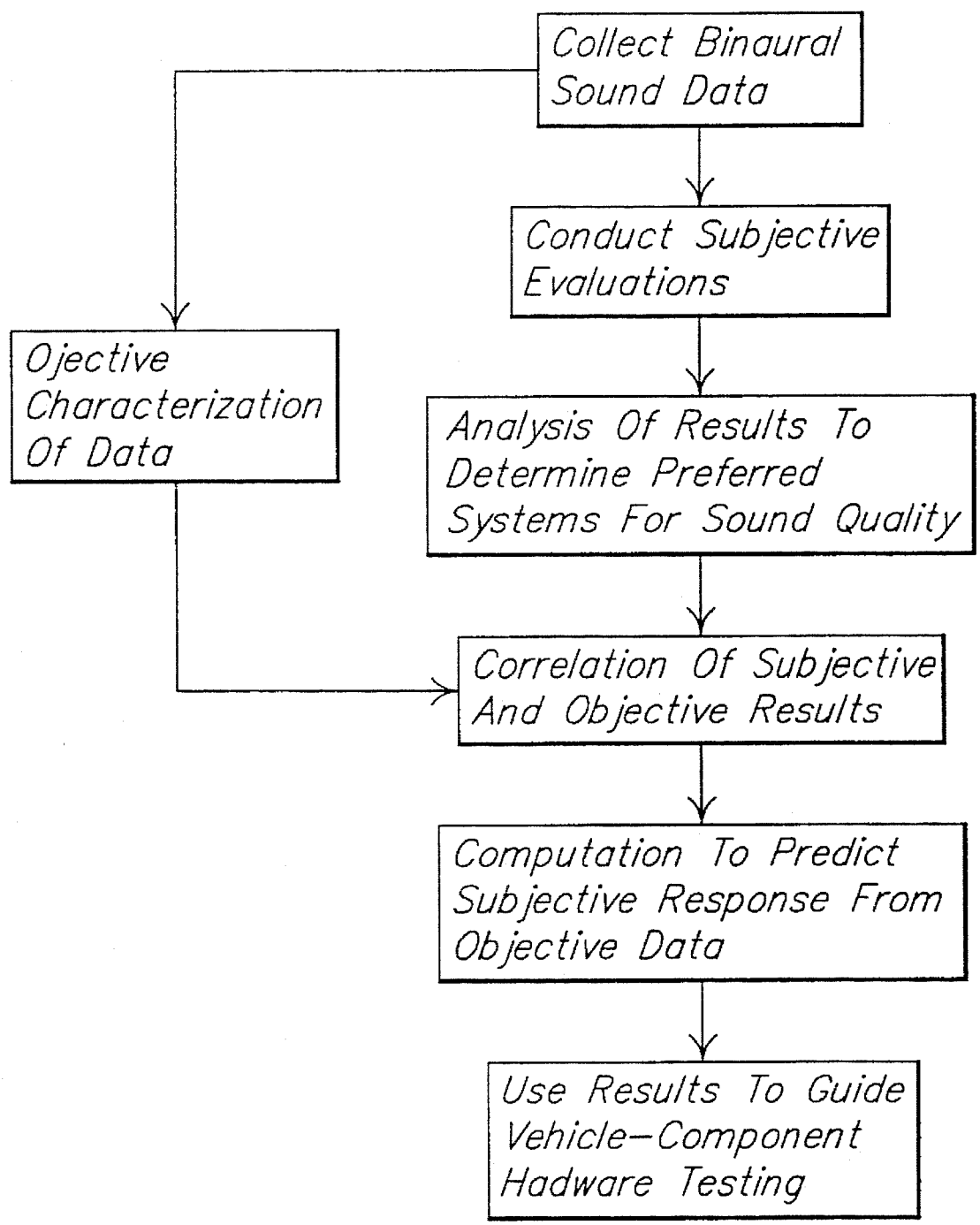
FIG. 4 is a flow chart representation of the method of the present invention

Finally, the results of the output of such a mathematical prediction can be used analyze a component testing without the repeated use of human evaluators. FIG. 4 illustrates, in flow chart form, the preferred method to be followed: collect binaural sound data and analyze from a plurality of samples; analyze and characterize the data objectively; conduct subject evaluations; analyze the results from the subjective evaluations to determine preferred samples for sound quality; correlate subjective and objective results through objective characterization; and mathematically using the correlation data, compute predictive results of subjective responses from objective data.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

We claim:

1. A method for predicting human evaluation of the latching and unlatching sounds of a power lock mechanism with the latching and unlatching sounds generated by the power lock mechanism, comprising the steps of:

collecting data on the latching and unlatching sounds of a plurality of samples of power lock mechanisms in a binaural manner, the data comprising a plurality of sound parameters;

subjectively evaluating the human perception of the quality of the sounds, based upon the level of multiple impact sounds;

ranking the power lock mechanism samples according to sound quality perceived;

correlating the data collected in the collecting step with the power lock mechanism sample rankings to define at least two sound parameters with direct causal relationship with the rankings; and computing the sound data predicted to be generated by locking and unlocking another sample of a power lock mechanism, the computing being effected through said at least two sound parameters.

2. A method as defined in claim 1 wherein one of said parameters is loudness during a fixed percent of the duration of the some.

3. A method as defined in claim 1 wherein one of said parameters is duration of sound.

4. A method as defined in claim 1 wherein one parameter is the duration of sound above a certain sound level.

5. A method as defined in claim 1 wherein said fixed percent is 10%.

6. A method as defined in claim 4 wherein said duration is that duration in which the sound level remains above 3 sones.

7. A method as defined in claim 1, wherein said data collecting step comprises the steps of positioning a latch in fixed relationship with respect to a binaural acoustic head;

applying power to the power lock mechanism to effect locking and unlocking of the lock mechanism; and collecting data from the binaural acoustic head and recording the data on a digital audio tape.

8. A method as defined in claim 7, wherein said step of subjectively evaluating comprises the steps of transferring the data from the digital audio tapes, the digital audio tapes being conditioned to prepare evaluation tapes for evaluation by human subjects.

* * * * *